Figure 1:
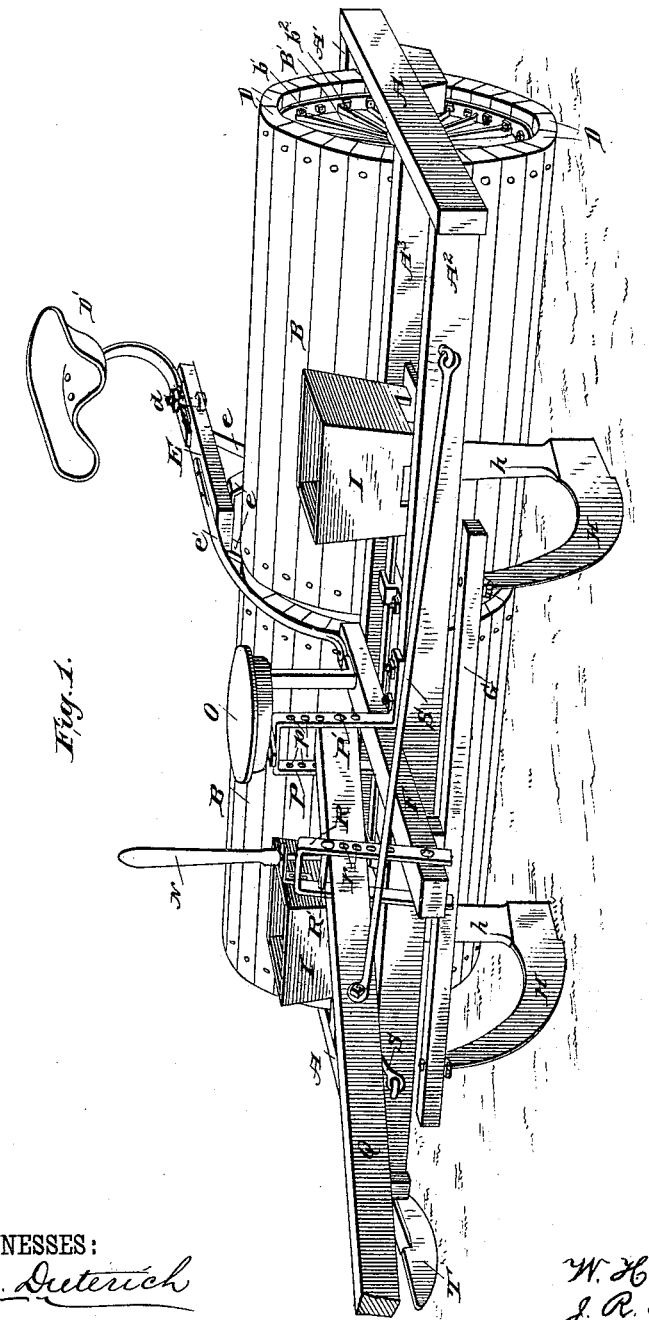

(No Model.) 2 Sheets—Sheet 1.

W. H. LITTELL & J. R. SCOFIELD.
PLANTER AND ROLLER.

No. 367,006. Patented July 19, 1887.

WITNESSES:
Fred G. Dieterich
O. B. Turpin

INVENTOR:
W. H. Littell
J. R. Scofield
BY Munn
ATTORNEYS.

(No Model.) 2 Sheets—Sheet 2.
W. H. LITTELL & J. R. SCOFIELD.
PLANTER AND ROLLER.
No. 367,006. Patented July 19, 1887.
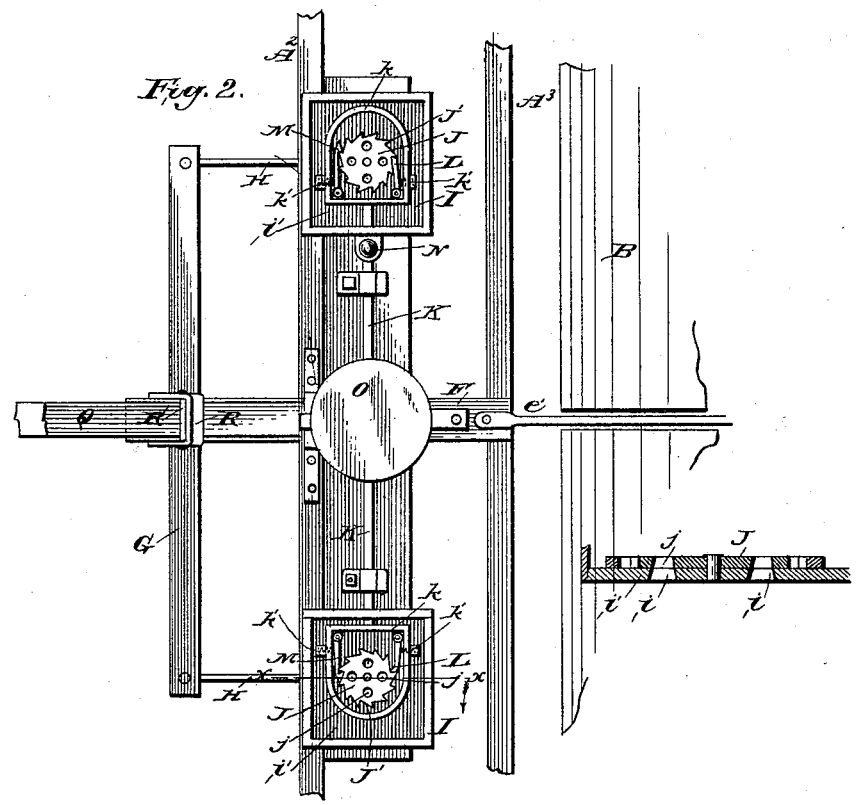
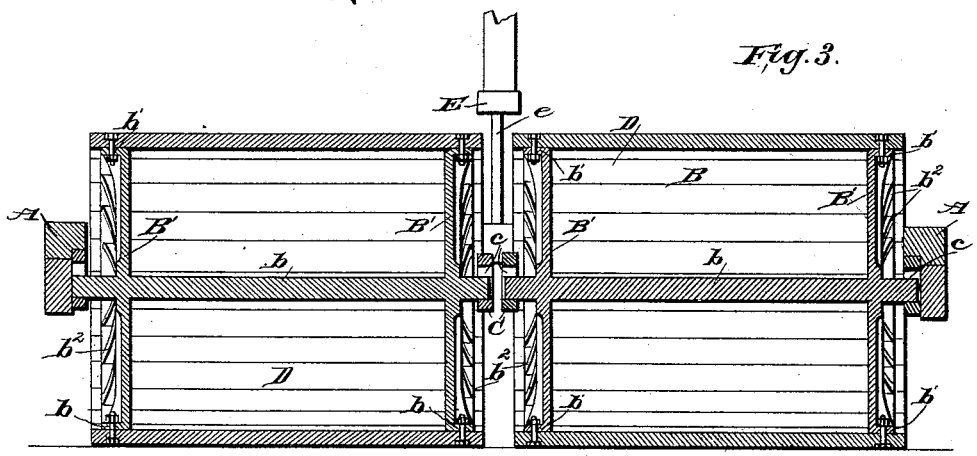
WITNESSES:
Fred G. Dieterich
P. B. Turpin
INVENTOR:
W. H. Littell
J. R. Scofield
BY Munn & Co
ATTORNEYS.

UNITED STATES PATENT OFFICE.

WILLIAM HENRY LITTELL AND JOHN REUBEN SCOFIELD, OF CHARLES CITY, IOWA; SAID SCOFIELD ASSIGNOR TO BENJAMIN TYLEY BAILEY, OF SAME PLACE.

PLANTER AND ROLLER.

SPECIFICATION forming part of Letters Patent No. 367,006, dated July 19, 1887.

Application filed April 21, 1887. Serial No. 235,632. (No model.)

*To all whom it may concern:*

Be it known that we, WILLIAM HENRY LITTELL and JOHN REUBEN SCOFIELD, citizens of the United States, residing at Charles City, in the county of Floyd and State of Iowa, have invented a new and useful Improvement in Planters and Rollers, of which the following is a specification.

This invention is an improvement in planters and rollers; and it consists in certain construction and combinations of parts, as will be hereinafter described, and pointed out in the claims.

In the drawings, Figure 1 is a perspective view of our machine. Fig. 2 is a top plan view of the front part of same, and Fig. 3 is a transverse vertical section drawn alongside the axles of the rollers.

The main frame in the construction shown comprises side bars, A A, rear bar, A', front bar, $A^2$, and intermediate cross-bar, $A^3$, arranged in rear of and parallel with the front bar. The ends of the axles $b$ of rollers B extend into vertically-elongated bearings $c\ c$ in the side bars, A A, and the central bearing-bar, C, which bar is secured to and between the rear bar, A', and cross-bar $A^2$. By means of these elongated bearings the roller is free to adjust to any unevenness of the ground.

The axles $b$ are formed—usually cast—integral with the head-plates B' of the rollers, which plates have circumferential flanges $b'$, to which are bolted the slats D, constituting the face or rim of the roller.

It will be understood that we do not claim as broadly new end plates for rollers having flanges to which the face-slats of the rollers are secured.

The heads and axles, being made in a single piece, form a rigid connection and avoid the necessity of connections between said parts. The end plate is formed with external radial ribs, $b^2$, which have the semblance of spokes.

The driver's seat D' is supported on beam E, which is supported on the upper ends of rods $e\ e'$, the lower ends of which are connected with the framing, respectively, in rear and front of the roller. The seat-standard is connected with the seat-beam E by a bolt, $d$, passed through a slot in said beam, so that the seat may be adjusted along said beam.

To the forward part of the main frame we secure the central beam, F, which extends forward from the main frame and supports the center of the bar G, to the ends of which the flukes H are fixed. The tubes $b$ of these flukes open at their upper ends under the openings $i$ in the bottom $i'$ of seed-boxes I. The dropping-disks J are journaled above the bottoms $i'$, and have openings $j$, which are movable into and out of register with the openings $i$. The said openings $j$ are formed flaring toward their lower ends, so that the seed will drop freely. These disks are formed or connected with ratchet-rings J', the same being preferably formed in the edges of the disk, as in frames $k$, attached to the slide K. We support pawls L M, which are spring-pressed at $k'$, into engagement with ratchets J'. One, L, of these pawls is a push-pawl, and the other, M, is a draw-pawl. By means of this construction the disk is given a partial rotation at each movement of the slide, the push-pawl operating on the forward movement of the slide and the draw-pawl on the reverse movement of such part.

The slide is moved by means of a lever, N, operated by the "dropper," as the person who operates this slide is called, to distinguish him from the driver. A seat, O, is provided for this dropper, such seat being supported on the framing in front of the roller. A standard, P, is mounted on the framing and forms one of the supports of the dropper's seat, and preferably is made in the shape of a loop or box. This standard is provided with a number of bolt-holes, $p$, for the bolt P', on which the rear end of the pole Q pivots, so that the point of support of said rear end may be adjusted as desired. The tongue extends forward through a keeper-frame, R, supported on the framing, usually on the center beam, F, and such keeper has a number of holes, $r$, in its side arms, so that the bolt R', which forms a stop and is arranged above the pole and serves as a stop therefor, may be adjusted up or down.

Rods S S connect at one end with the pole, and at their rear ends with the front of the framing, and serve to transmit the draft force from the pole to the machine.

The marker T may be adjusted to either side of the machine, as desired.

The operation will be understood from the drawings and foregoing description. It will be noticed that the weight of the driver, when the dropper is off the machine, will elevate the flukes clear of the ground. Thus at the end of a row, when the dropper gets off to turn the marker to the opposite side, the weight of the driver will elevate the flukes, so that the machine may be easily turned. Then, on the dropper resuming his seat, the flukes will be properly pressed down in position for use.

Manifestly the roller can be detached and used separately.

Having described our invention, what we claim is—

1. The combination of the main frame, the central beam, F, the dropper's seat O, the driver's seat, the beam E, the rod $e'$, supporting beam E from the beam F, and the rod $e$, supporting such beam from the rear part of the main frame, substantially as set forth.

2. The combination of the framing, the roller, and dropping mechanism, the standard P, the pole pivoted thereto, and the keeper-frame R, fitted over the tongue in advance of the standard P and having a stop, $R'$, substantially as set forth.

3. The combination, in a machine substantially as herein described, of the main frame, the standard P, having a plurality of bolt-openings, the tongue, the pivot-bolt connecting said tongue to standard P and adjustable to one or the other of the bolt-openings, a stop-frame, and a stop adjustably supported therein, substantially as set forth.

4. The roller, axle, and head-plates formed integral and the head-plates having circumferential flanges, combined with the face-bars or slats bolted to said flanges, substantially as set forth.

5. The combination of the main frame, the center beam secured to and projected forward from said frame, the roller, the dropping mechanism, the cross-bar G, secured to the center bar, the flukes connected with said cross-bar, the standard P, the bolt P', the keeper-frame R, the stop-bolt R', and the pole, all substantially as and for the purpose specified.

WILLIAM HENRY LITTELL.
JOHN REUBEN SCOFIELD.

Witnesses:
J. SNAVE DETWILER,
GEO. F. BOULTON.